(12) United States Patent
Albertelli

(10) Patent No.: US 7,543,416 B2
(45) Date of Patent: Jun. 9, 2009

(54) PRODUCTION OF GLAZED PANELS

(75) Inventor: Aldino Albertelli, London (GB)

(73) Assignee: Acell Holdings Limited, St. Peter Port, Guernsey (GB)

( * ) Notice: Subject to any disclaimer, the term of this patent is extended or adjusted under 35 U.S.C. 154(b) by 584 days.

(21) Appl. No.: 10/479,154

(22) PCT Filed: May 29, 2002

(86) PCT No.: PCT/GB02/02508

§ 371 (c)(1),
(2), (4) Date: May 28, 2004

(87) PCT Pub. No.: WO02/096623

PCT Pub. Date: Dec. 5, 2002

(65) Prior Publication Data

US 2004/0206021 A1    Oct. 21, 2004

(30) Foreign Application Priority Data

May 30, 2001    (GB) .................................. 0113063.2

(51) Int. Cl.
| | | |
|---|---|---|
| E06B 3/70 | (2006.01) | |
| E04B 1/00 | (2006.01) | |
| E04C 2/54 | (2006.01) | |
| E04C 2/38 | (2006.01) | |
| B32B 17/10 | (2006.01) | |
| E04C 1/00 | (2006.01) | |

(52) U.S. Cl. .................. 52/455; 52/745.15; 52/800.14; 52/784.15; 52/309.9; 156/99

(58) Field of Classification Search ... 52/800.1–802.11, 52/716.8, 717.01, 204.5, 745.15, 784.14, 52/208, 204.62, 455–458, 309.1–309.17, 52/784.15, 786.1, 786.13, 794.1; 156/99, 156/108; 428/34

See application file for complete search history.

(56) References Cited

U.S. PATENT DOCUMENTS 2,090,480 A * 8/1937 Hawley ..................... 52/794.1

(Continued)

FOREIGN PATENT DOCUMENTS

GB    1 375 255 A    11/1974

(Continued)

*Primary Examiner*—Richard E Chilcot, Jr.
*Assistant Examiner*—Ryan D Kwiecinski
(74) *Attorney, Agent, or Firm*—Hodgson Russ LLP

(57) ABSTRACT

A process for the manufacture of a glazable, molded panel, door or window which molding includes, on at least three sides of the area to be glazed, a plastics foam core and one or more continuous, integral skins comprising a synthetic polymer, which process includes: forming the plastics foam core with a continuous groove in register with the intended position of the glazing, the groove extending along the at least three sides of the area to be glazed; lining the groove with a layer of a synthetic polymer which may be the same as or different from the skin polymer(s), the layer being at least partly contiguous with the or each skin; slidably inserting a former into the groove; and molding the panel, door or window with the application of heat and pressure thereby bonding the layer of synthetic polymer to the or each skin to form a continuous, integral skin of a synthetic polymer about the at least three sides of the area to be glazed.

21 Claims, 5 Drawing Sheets

U.S. PATENT DOCUMENTS

| | | | |
|---|---|---|---|
| 3,226,903 A * | 1/1966 | Lillethun | 52/172 |
| 4,374,693 A * | 2/1983 | Pitt | 156/267 |
| 4,424,653 A * | 1/1984 | Heinen | 52/204.55 |
| 4,459,789 A * | 7/1984 | Ford | 52/656.5 |
| 4,843,103 A * | 6/1989 | Albertelli et al. | 521/83 |
| 4,864,789 A * | 9/1989 | Thorn | 52/309.9 |
| 5,058,342 A * | 10/1991 | Crompton | 52/232 |
| 5,142,835 A * | 9/1992 | Mrocca | 52/309.12 |
| 5,577,363 A * | 11/1996 | Tate et al. | 52/784.15 |
| 5,631,088 A * | 5/1997 | Harper | 428/426 |
| 5,853,828 A * | 12/1998 | Schimmelpenningh et al. | 428/34 |
| 6,003,277 A * | 12/1999 | Graham et al. | 52/309.7 |
| 6,688,064 B1 * | 2/2004 | Swanick | 52/455 |

\* cited by examiner

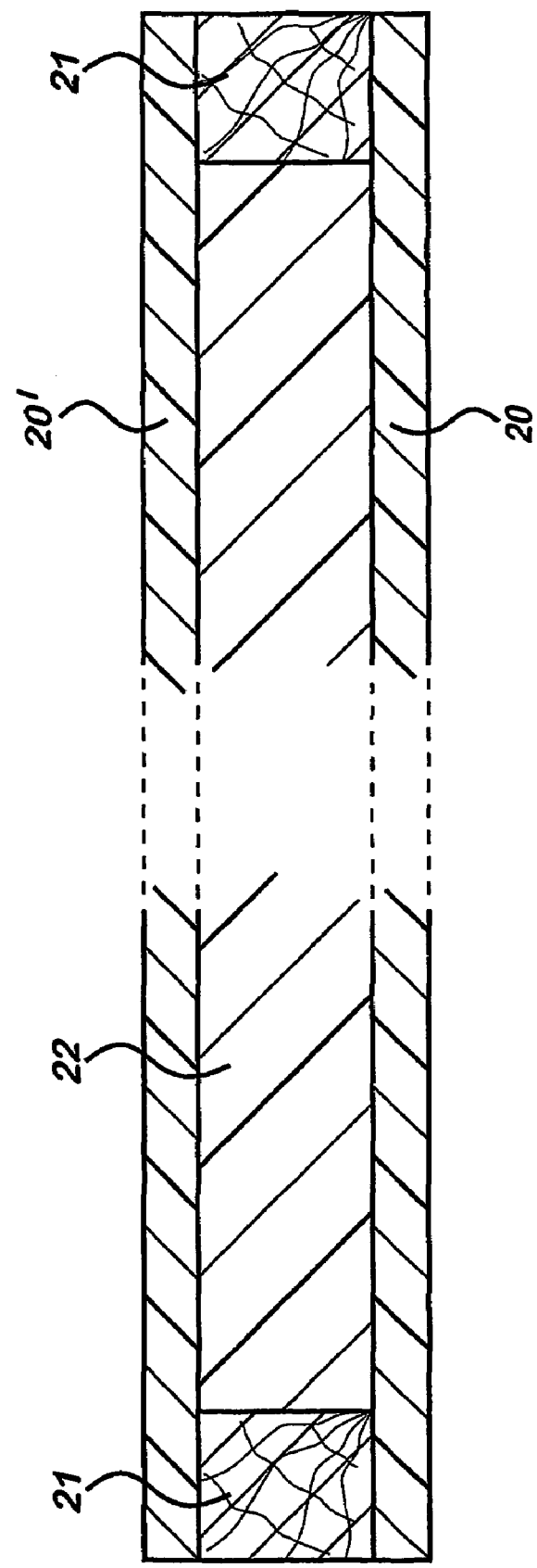

PRODUCTION OF GLAZED PANELS

BACKGROUND

THIS INVENTION relates to shaped bodies, for example those used in the building and furnishing industries. More particularly, this invention relates to synthetic resin mouldings such as panels, doors and windows.

In the production of such synthetic resin mouldings, certain areas of the main panel, door or window have sections which have a decorative or functional, such as a glazing, effect. Around the perimeter of such sections a restraining moulding is typically applied which projects before the face of the section and which generally has an aesthetic appearance, termed a bolection. Where the bolection is fabricated as a synthetic resin moulding, it is found that not only the dimensional stability and consequent alignment of the bolection but also its colour and gloss match with the main panel have given rise to intractable quality control problems.

The present invention seeks to provide a new process to overcome these problems.

SUMMARY

According, therefore, to one aspect of this invention there is provided a process for the manufacture of a glazable, molded panel, door or window which moulding includes, on at least three sides of the area to be glazed, a plastics foam core and one or more continuous, integral skins comprising a synthetic polymer, which process includes:

forming the plastics foam core with a continuous groove in register with the intended position of the glazing, the groove extending along the at least three sides of the area to be glazed;

lining the groove with a layer of a synthetic polymer which may be the same as or different from the skin polymer(s), the layer being at least partly contiguous with the or each skin;

slidably inserting a former into the groove; and moulding the panel, door or window with the application of heat and pressure thereby bonding the layer of synthetic polymer to the or each skin to form a continuous, integral skin of a synthetic polymer about the at least three sides of the area to be glazed.

According, to one embodiment of this aspect of the invention, there is provided a process for the manufacture of a glazable molded panel, door or window which moulding includes, on at least three sides of the area to be glazed, a plastics foam core and one or more continuous, integral skins comprising a synthetic polymer, which process includes:

forming the plastics foam core with a continuous groove in register with the intended position of the glazing, the groove extending along the at least three sides of the area to be glazed;

lining the groove with a plastics channel interposed contiguously between which groove and channel is a synthetic polymer which may be the same as or different from the skin polymer(s);

slidably inserting a former into the groove; and moulding the panel, door or window with the application of heat and pressure thereby forming a continuous, integral skin of a synthetic polymer on the at least three sides of the area to be glazed.

According to a second embodiment of this aspect of the invention the plastics channel and the lining of synthetic polymer is replaced by generally parallel sheets of the synthetic polymer, such as glass reinforced plastics sheet, typically of 1.5 mm thickness before moulding, secured to a frame such as a timber frame, for example by staples, which frame only partially fills the extremity of the groove. The former is then slotted between the sheets of synthetic polymer.

The term "glazing" is used herein broadly and without limitation. Thus, it covers single pane as well as double or triple glazing. The glazing material may be conventional silicate glass or toughened glass or it may be a plastics material such as polycarbonate. The glazing material may also be uncoated or coated; for example, coated with a shatter proof coating of PVB. Furthermore, the glass may be coated to be (at least partially) reflective; may be coloured or clear; and may be transparent or translucent.

The term "panel" is used herein broadly and includes false walls, wall facias, office dividers and the like.

The or each synthetic polymer from which the skin(s) are fabricated may be any polymer customarily used in the resin fabricating industry; and without prejudice to the generality of this statement may comprise a filled or unfilled thermoplastic addition or condensation polymer. Preferably, it may comprise a polymer of a vinyl halide such as vinyl chloride; for example PVC, especially uPVC, or a polyester. The synthetic polymer may also be crosslinkable in a manner known per se. Where the synthetic polymer is a filled polymer it is preferred that the filler may comprise a fibrous filler: it is particularly preferred that the filler may comprise glass fibre.

Suitably, the plastics foam may be a polystyrene, a polyurethane or a phenolialdehyde foam, preferably a phenol/aldehyde foam. Desirably, the foam may be a substantially open cell foam. While it is possible to use a foam with a density of 20 kg m$^{-3}$ or more, it is found desirable to include a filler in the foam to furnish a foam with a density of 75 kgm$^{-3}$ or more. Such a density makes the resulting panel, door or window sound and handle more like a conventional wooden product.

A particularly suitable foam is a substantially rigid filled phenolic foam preparable by effecting a curing reaction between:

a) a liquid phenolic resole and b) a strong acid hardener for the resole, in the presence of c) a finely divided inert and insoluble particulate solid which is present in an amount of at least 5% by weight of the liquid resole and is substantially uniformly dispersed through the mixture containing resole and hardener;

the temperature of the mixture containing resole and hardener not exceeding 85° C. and the temperature and concentration of the acid hardener being such that compounds generated as by-products of the curing reaction are volatilised within the mixture before the mixture sets whereby a foamed phenolic resin product is produced.

Details of such foams and their preparation are disclosed in International (PCT) Patent Publication WO99/35364, the contents of which are incorporated herein by reference.

The synthetic polymer, which may be interposed contiguously between the groove and the channel or may be secured to a frame in the groove, may be the same as or different from the skin polymer(s). It is particularly preferred that the skin polymer and the said interposed polymer are glass fibre reinforced polymer. The plastics channel may also be PVC or polyester; including glass fibre-filled polyester; for example, prepared by a pultrusion process. After moulding with heat and pressure, the skins; interposed polymer and (where present) plastics channel are formed into a continuous, integral skin.

Preferably two skins, which may be the same or different, are adhesively bonded to opposing faces of the panels, doors or windows. The panels, doors or windows also include a frame or frame members which are suitably fabricated from wood.

In accordance with the process of this invention, the groove may be formed in the exposed surface of the filled plastics foam by engaging the exposed surface with a cutting tool of predetermined profile; and effecting relative motion between the exposed surface and the cutting tool in a direction generally parallel to the exposed surface. The predetermined profile may include at least one dovetail-forming region. It is a desirable (but not essential) feature of the invention that the opposing faces of the panel, door or window are symmetrical. Preferably, the former may be fabricated from a plastics foam as herein described. Suitably, it may be inserted through a slot in the plastics foam which cooperates with the groove. If desired, after moulding, the perimeter of the aperture is trimmed. Then, the (remains of the) former may be replaced with glazing; for example, by manually tapping out the former and inserting the glazing through the said slot. The slot may preferably be in the included top rail of the panel, door or window. The slot may be lined prior to moulding with plastics walls interposed contiguously between which walls and channel is a synthetic polymer which may be the same as or different from the skin polymer(s). In the final stage of the process, the top rail may suitably be capped with a polyurethane foam. Finally, it is desirable that a beading is provided around the perimeter of one or both opposing faces of the panel, door or window.

This invention also provides a glazed molded panel, door or window preparable by the hereindescribed process of the invention. Desirably, the invention includes a glazable molded panel, door or window which moulding includes, on at least three sides of the area to be glazed, one or more continuous, integral skins comprising a synthetic polymer. Suitably, the glazable or glazed panel, door or window is one wherein the opposing faces of the panel, door or window are symmetrical. Preferably, the glazed molded panel, door or window is one which includes no bolection about the glazed area.

BRIEF DESCRIPTION OF THE DRAWINGS

The invention will now be further described, by way of example, with reference to the accompanying drawings in which:

FIG. 5 represents, in cross-section, detail of the second embodiment of this invention.

DETAILED DESCRIPTION

Figure 1:
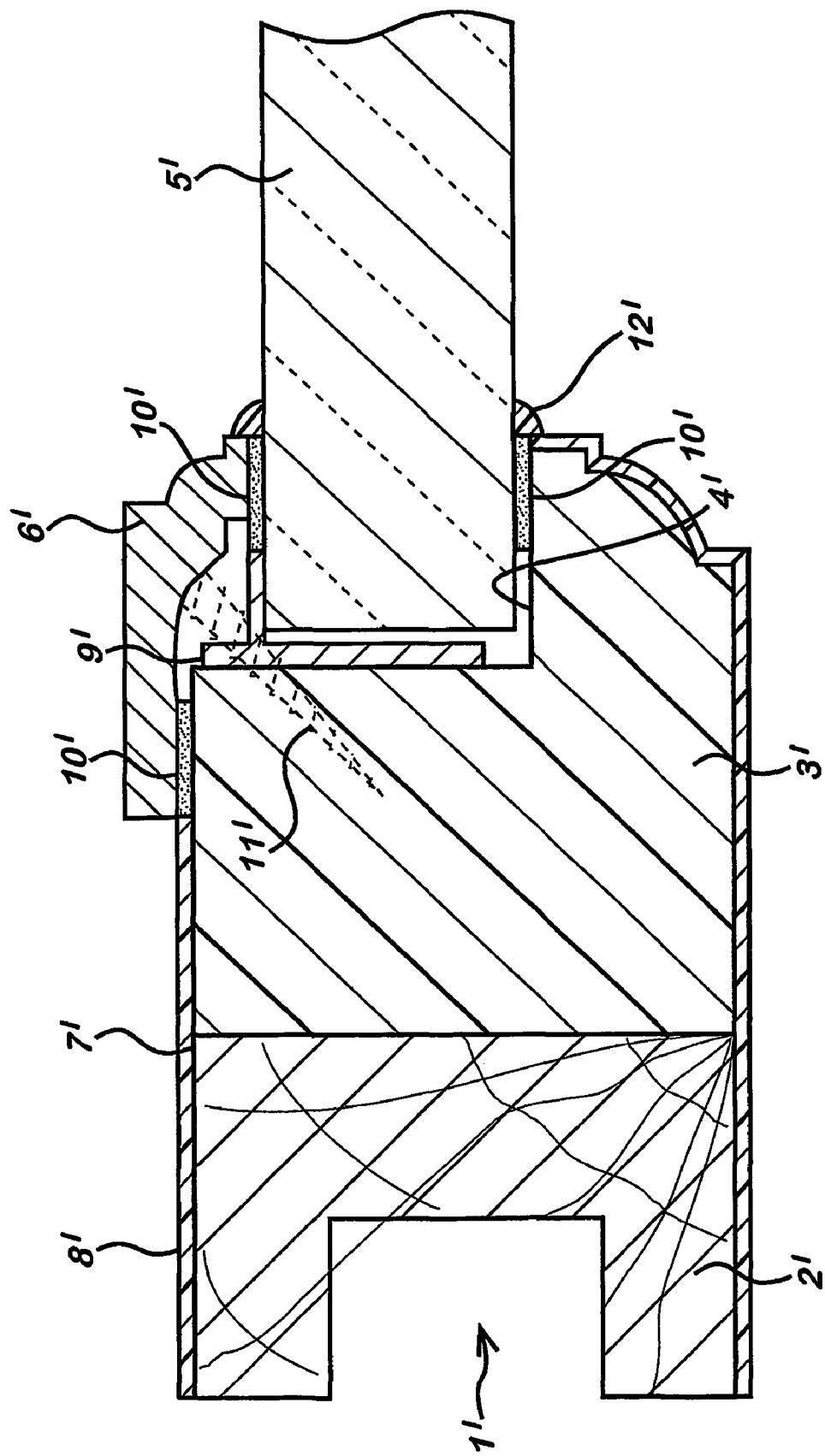
FIG. 1 represents, in partial top plan cross-section, the prior art construction which gives rise to the problem.

In the prior art construction represented in FIG. 1, there is shown part of a glazed panel for a door including a frame (1') which is fabricated from wood (2') and from a filled phenolic foam insert (3'). The foam insert is formed along its length with a rebate (4') dimensioned to receive the glazing (5') and to seat the bolection (6') in correct alignment. The externally presented surfaces (7') of the frame are faced with a molded synthetic resin skin (8') interposed between which and the frame is a glass mat (not shown) into which, on moulding, the resin permeates to produce a glass reinforced plastics (GRP) product.

An extruded aluminium glazing clip (9') is held along its length to the foam insert with tines (not shown) to form with the rebate a groove into which the glazing slots to rest on double sided adhesive tape (10') of thickness about 1.5 to 2.0 mm. The bolection seats on the synthetic resin skin and on the glazing, the seating in both instances being also on double sided adhesive tape, and is retained by screw (11') which passes through the glazing clip and into the foam moulding. The junction of the glazing and the adhesive layer is sealed with a silicone beading (12').

Figure 2:
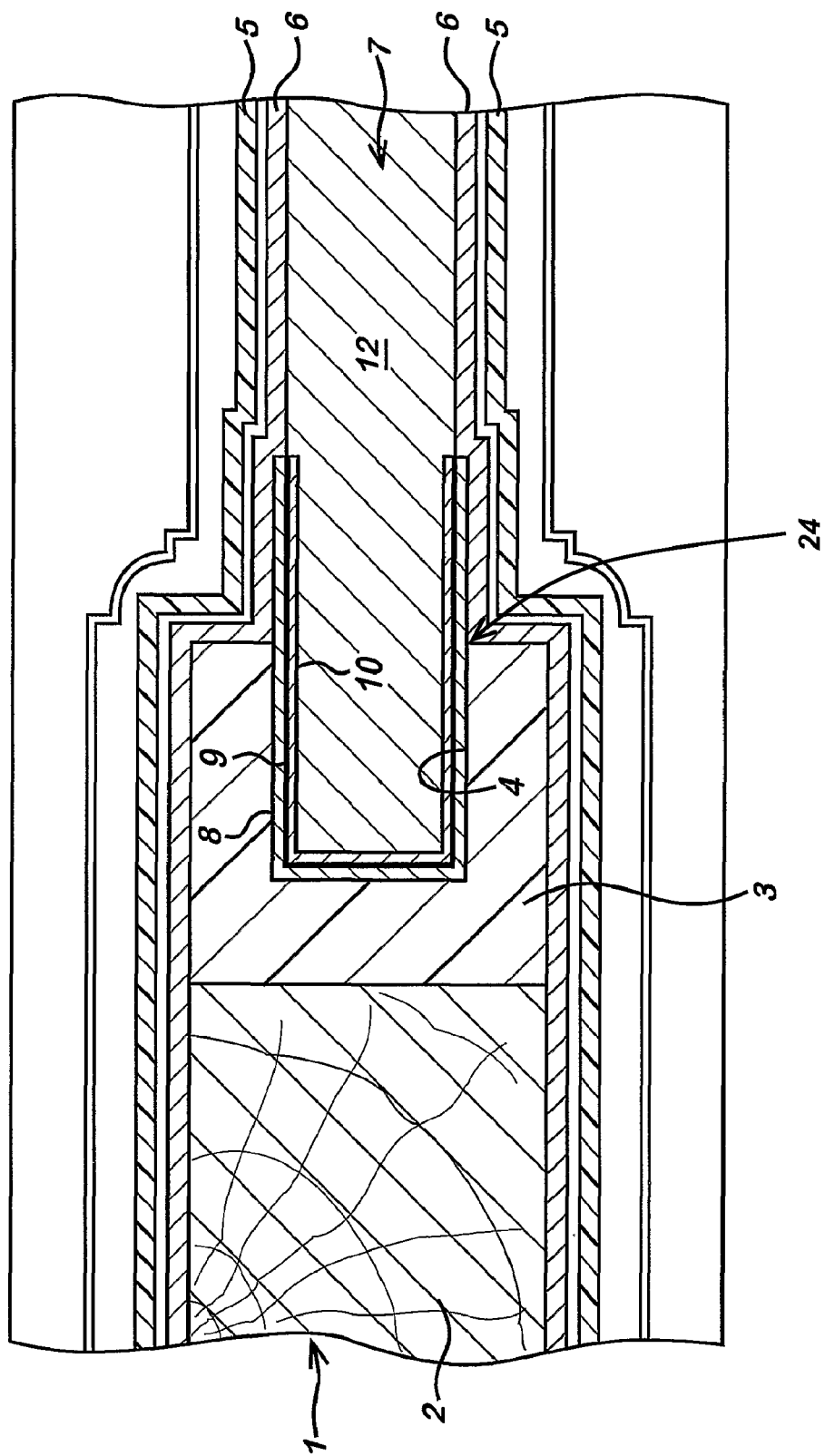
FIG. 2 represents, in partial cross-section, the materials laid up in a mould prior to moulding in accordance with the invention.
Figure 3:
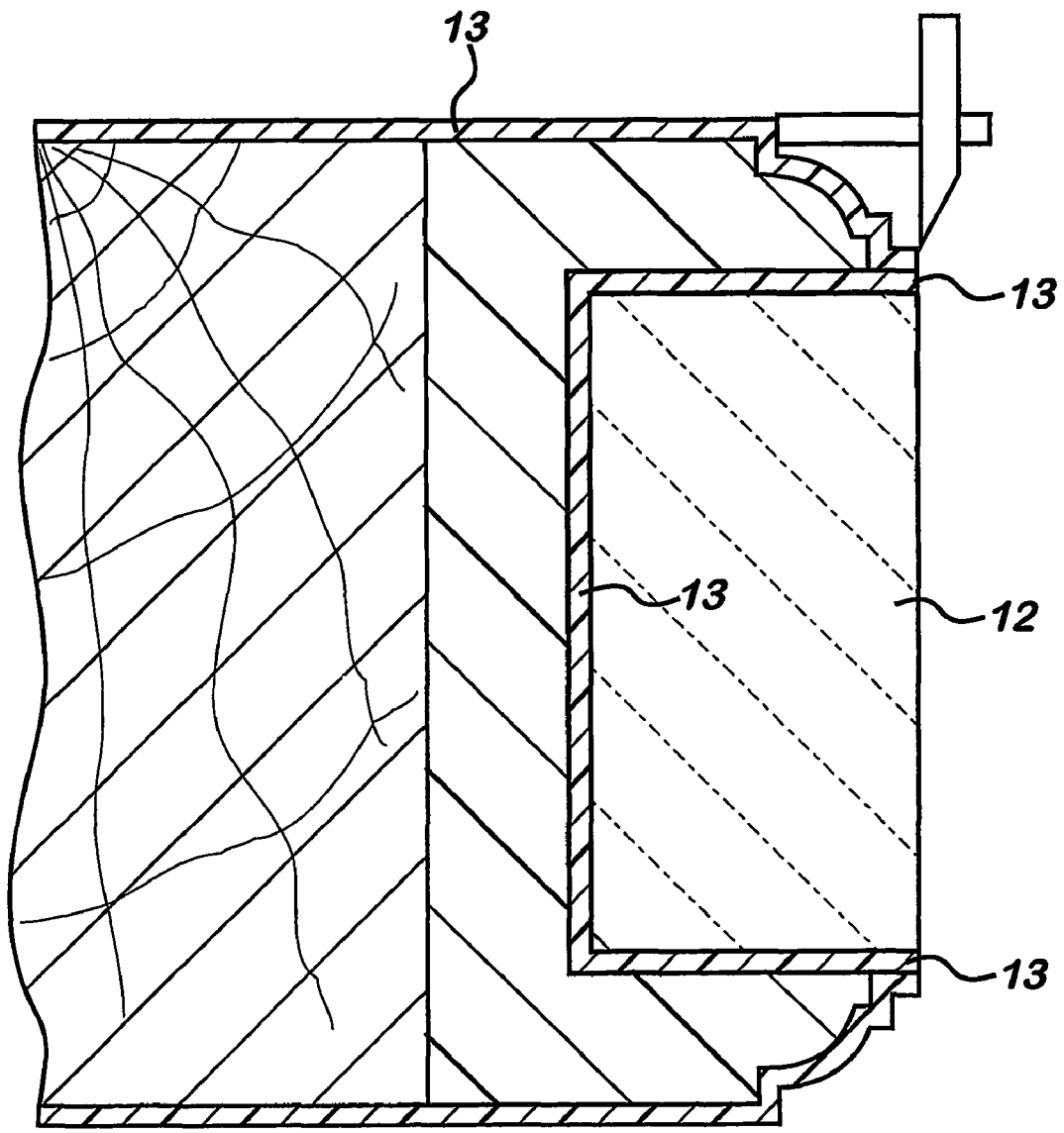
FIG. 3 represents, in partial cross-section, the trimmed molded precursor of the invention.
Figure 4:
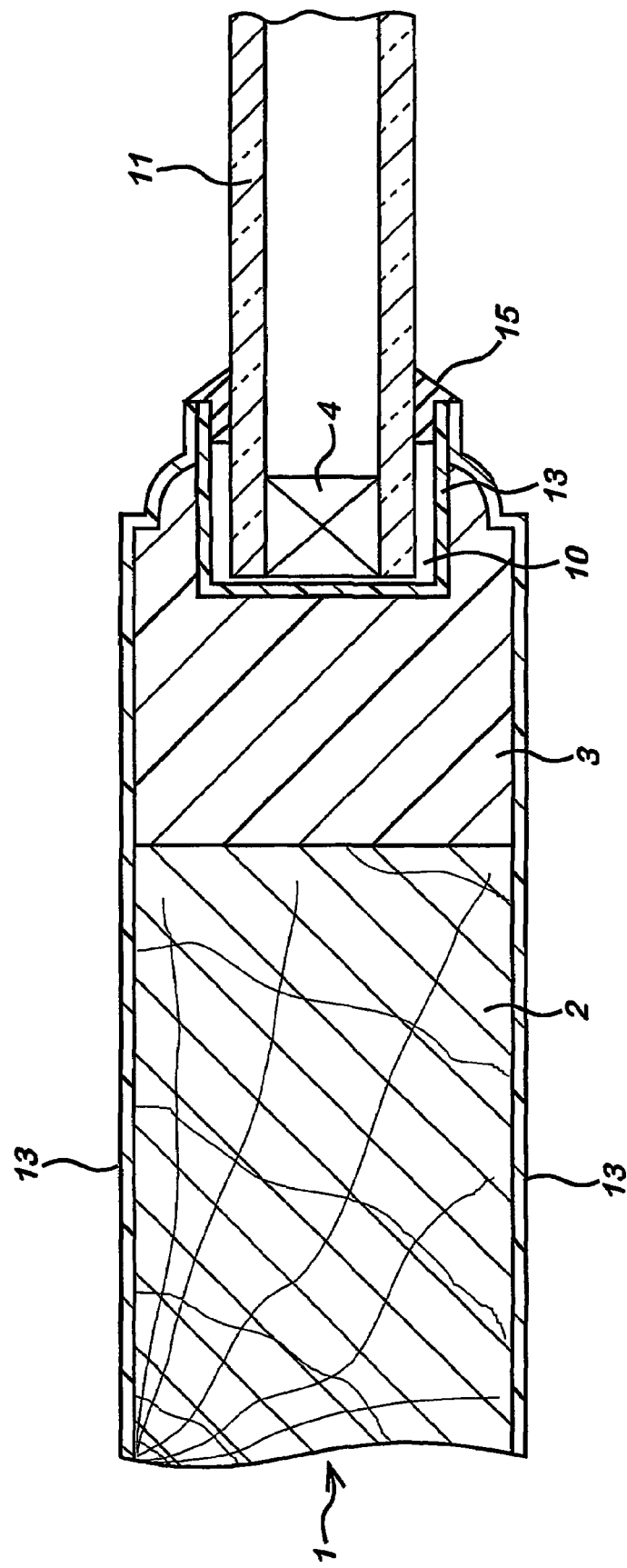
FIG. 4 represents, in partial cross-section, the glazed construction of the invention.

In the construction according to the present invention which is represented in FIGS. 2 to 4, inclusive, there is shown a lay-up, in a mould, of part of a glazable panel for a door which includes a frame (1) which is fabricated from wood (2) and from a filled phenolic foam core (3) which core includes along at least three sides of the area to be glazed a groove (4), symmetrically disposed in section. The externally presented surfaces of the frame are faced with a synthetic resin skin (5) interposed between which and the frame is a glass mat (6), the resin skin and glass mat extending also over the glazable area (7). The groove is also lined with a glass mat (8) and synthetic resin layer (9); and is profiled to receive a PVC lining-channel (10) which, in turn, is dimensioned and positioned to receive a sealed double glazing unit (11). A former (12), formed from the filled phenolic foam, is slidably inserted via a slot (not shown) in the top rail through a slot (24) in the plastic foam core (3) into the lining channel.

The panel, door or window is produced from such a lay-up by closing this mould and applying heat and pressure. The temperature increases, during the reactive moulding, to between 100° and 150° C., such as 125° C., while the applied pressure is from 50 to 70 tonnes m$^{-2}$, typically 100 tonnes per 1.7 m$^2$ area. The molded blank precursor of the construction according to the invention is then removed from the mould and the area to be glazed is routed (as is shown in FIG. 3). The remains of the former (12) are then removed manually to expose a continuous, interposed skin (13) from one side of the construction via the lining channel to the other side which is formed, on moulding, by the synthetic resin permeating the glass mat to produce a glass reinforced (GRP) plastics product.

The glazing unit (11) is next incorporated into the lining channel and pre-formed, push-fit PVC strip seals (15) are manipulated around both external aspects of the glazing unit. Finally, the top rail is closed by insertion of a pre-formed PU foam insert and capped with a top plate to seal the construction (not shown).

FIG. 5 depicts the groove lining of the second embodiment of the invention in which glass reinforced plastic sheets (20, 20') are secured by staples (not shown) to a timber frame (21). This lining is fitted into the groove and the former (22) is then inserted therein.

The process of the present invention furnishes at least some of the following advantages:
  colour match problems reduced or eliminated;
  alignment problems reduced or eliminated;
  surface shine problems reduced or eliminated;
  reduces "handling" of the panel, door or window.

The invention claimed is:

1. A process for the manufacture of a glazable, molded panel, door or window which moulding includes, on at least three sides of the area to be glazed, a plastics foam core and one or more continuous, integral skins comprising a synthetic polymer, which process includes:

forming the plastics foam core with a continuous groove in register with the intended position of the glazing, the groove extending along the at least three sides of the area to be glazed;

lining the groove with a layer of a synthetic polymer which may be the same as or different from the skin polymer(s), the layer being at least partly contiguous with the or each skin;

slidably inserting a former into the groove wherein the former and the glazing are inserted through a slot in the plastics foam which co-operates with the groove; and moulding the panel, door or window with the application of heat and pressure thereby bonding the layer of synthetic polymer to the or each skin to form a continuous, integral skin of a synthetic polymer about the at least three sides of the area to be glazed.

2. A process according to claim 1 wherein the synthetic polymer comprises a polymer of a vinyl halide or a polyester.

3. A process according to claim 1 wherein the synthetic polymer is crosslinkable.

4. A process according to claim 1 wherein the synthetic polymer is a filled polymer.

5. A process according to claim 4 wherein the filled polymer includes a filler; the filler comprising a fibrous filler.

6. A process according to claim 5 wherein the filler comprises glass fiber.

7. A process according to claim 1 wherein the plastics foam is a polystyrene, polyurethane or a phenol/aldehyde foam.

8. A process according to claim 1 wherein the plastics foam is a filled foam.

9. A process according to claim 8 wherein the filled plastics foam is preparable by effecting a curing reaction between:
 a. a liquid phenolic resole and
 b. a strong acid hardener for the resole, in the presence of
 c. a finely divided inert and insoluble particulate solid which is present in an amount of at least 5% by weight of the liquid resole and is uniformly dispersed through the mixture containing resole and hardener the temperature of the mixture containing resole and hardener not exceeding 85° C. and the temperature and concentration of the acid hardener being such that compounds generated as by-products of the curing reaction are volatilized within the mixture before the mixture sets whereby a foamed phenolic resin product is produced.

10. A process according to claim 1 wherein the plastics foam is an open cell foam.

11. A process according to claim 1 wherein the plastics foam has a density of $75 kgm^{-3}$ or more.

12. A process according to claim 1 wherein two skins, which may be the same or different, are adhesively bonded to opposing faces of the panel, door or window.

13. A process according to claim 1 wherein the opposing faces of the panel, door or window are symmetrical.

14. A process according to claim 1 wherein, after moulding, the perimeter of the aperture is trimmed.

15. A process according to claim 1 wherein the (remains of the) former are replaced with the glazing.

16. A process according to claim 1 wherein the slot is in the intended top rail of the panel, door or window.

17. A process according to claim 1 wherein the slot is lined, prior to moulding with plastics wall interposed contiguously between which walls and channel is a synthetic polymer which may be the same as or different from the skin polymer(s).

18. A process according to claim 1 wherein a beading is provided around the perimeter of one or both opposing faces of the panel, door or window.

19. A glazed molded panel, door or window preparable by a process according to claim 1.

20. A glazed glazable, molded panel, door or window according to claim 19 wherein the opposing faces of the panel, door or window are symmetrical.

21. A glazed molded panel, door or window according to claim 19 which includes no bolection about the glazed area.

* * * * *